United States Patent [19]

Khanna et al.

[11] Patent Number: 4,876,127

[45] Date of Patent: Oct. 24, 1989

[54] METHOD OF BLOW MOLDING POLYAMIDES

[75] Inventors: Yash P. Khanna, Cedar Knolls; Himangshu R. Bhattacharjee, Randolph; Rakesh Kumar, Budd Lake; Jon I. Williams, Montclair; John P. Sibilia, Livingston, all of N.J.

[73] Assignee: Allied-Signal Inc., Morris Township, Morris County, N.J.

[21] Appl. No.: 269,030

[22] Filed: Nov. 9, 1988

[51] Int. Cl.$^4$ .............................................. B27N 5/02
[52] U.S. Cl. ..................................... 428/35.7; 264/85; 264/210.6; 264/211; 264/572
[58] Field of Search ............. 428/35.7; 264/85, 210.6, 264/211, 572

[56] References Cited

U.S. PATENT DOCUMENTS

| | | | |
|---|---|---|---|
| 3,509,107 | 4/1970 | Brignac | 528/487 |
| 3,860,559 | 1/1975 | Minami et al. | 528/182 |
| 4,299,945 | 11/1981 | Aya et al. | 528/126 |
| 4,666,649 | 5/1987 | Takubo et al. | 264/176.1 |
| 4,740,335 | 4/1988 | Scholz et al. | 264/293 |
| 4,798,697 | 1/1989 | Nohara et al. | 264/255 |

FOREIGN PATENT DOCUMENTS 569184  5/1945  United Kingdom .

Primary Examiner—Morton Foelak
Attorney, Agent, or Firm—Richard C. Stewart; Gerhard H. Fuchs

[57] ABSTRACT

This invention relates to a process for blow molding polyamide compositions where the molten polyamide includes an effective amount of one or more aryl phosphoryl azide compounds.

20 Claims, 1 Drawing Sheet

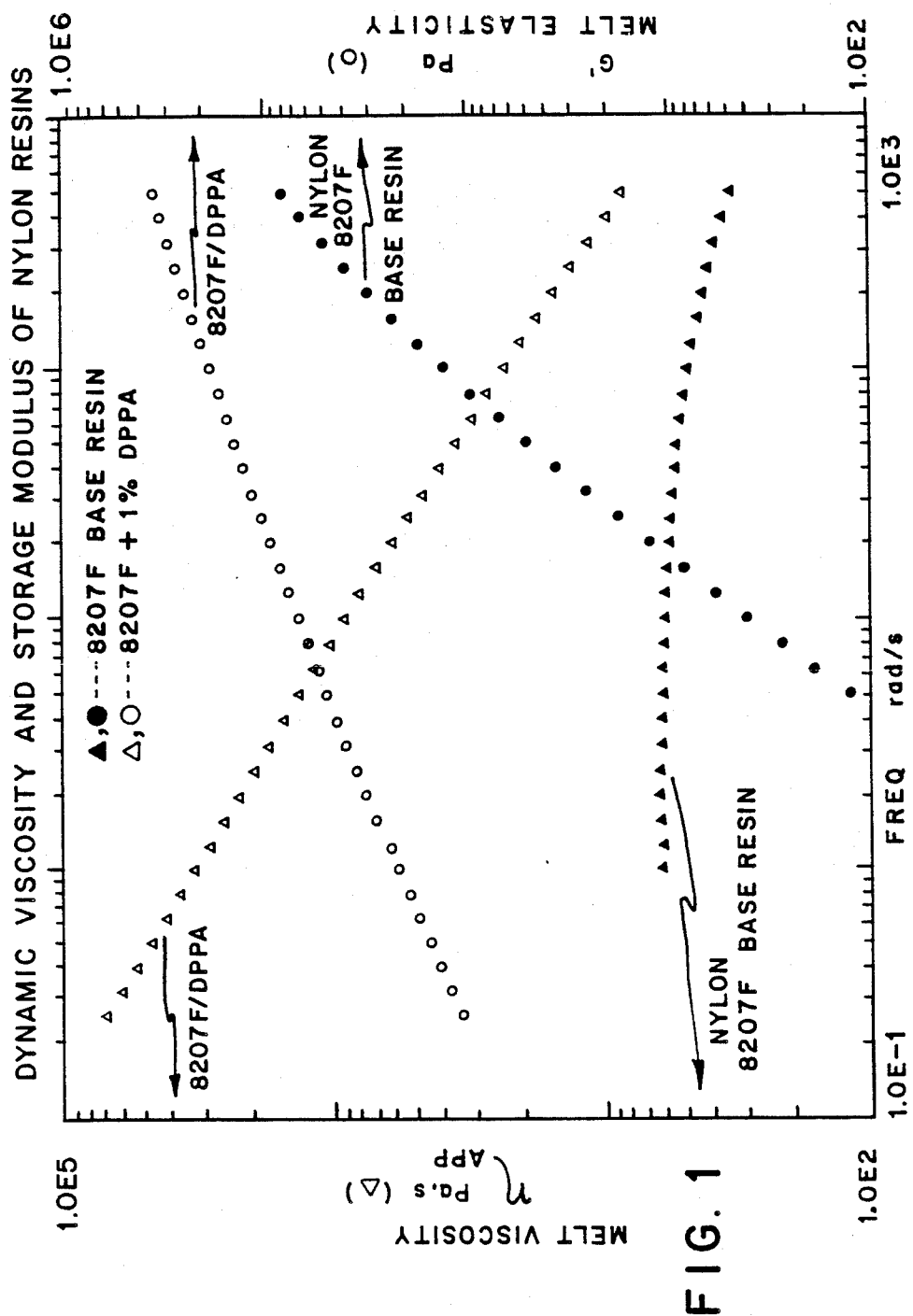

METHOD OF BLOW MOLDING POLYAMIDES

BACKGROUND OF THE INVENTION

1. Field of the Invention

This invention relates to a process of blow molding polyamide compositions. More particularly, this invention relates to an improved process for blow molding polyamide composition where the molten polyamide composition includes an effective amount of one or more aryl phosphoryl azide compounds.

2. Description of the Prior Art

While blow molded thermoplastics have been used for several years to manufacture automotive parts such as windshield washer fluid reservoirs, radiator overflow tanks, load floors, seat backs and shock absorber boots, the choice of resins has been limited mainly to high density polyethylene and polyester elastomers. Both have suitable processing ranges, but neither is noted for high-temperature resistance (both mechanical and chemical) or paintability. Nylon polymers, because of their inherent physical and chemical properties, can extend the range of product application for improved performance in high and low-temperature environments, and also can be painted.

However, the traditional array of nylon products has not included a true general-purpose blow molding resin. Although some have been used to a limited degree in the automotive industry and elsewhere, nylon resins in general have lacked broad applicability for blow molding because of the severely restricted processing latitude.

There are several properties which are necessary for blow molding resins. These resins should exhibit a high melt viscosity that is relatively independent of shear rate and a melt viscosity that has a relatively low dependence on processing temperature. Moreover, these resins should exhibit a large difference between processing temperature and freezing temperature (for crystalline resins) or a wide temperature range over which the resin will flow in the case of amorphous (noncrystalline) materials. Lastly, these resins should possess an optimum elastic compliance (melt elasticity) to provide the necessary melt strength for the parison to hang.

When the above criteria are applied to a typical nylon, the thermodynamic behavior of common nylon 66 homopolymer shows the resin lacking several of the characteristics important to blow molding. For example, in the case of nylon 666 homopolymer, the melting point is about 500° F. and the freezing point is 464° F. There are two significant opposing factors that result from this thermodynamic behavior. The relative proximity of freezing and melting temperatures dictates that the processing temperature be as high as possible above the freezing temperature. The greater this difference, the longer can be the parison drop time and hang time before portions of the parison to cool to the freezing temperature. If any portion of the parison cools too close to the freezing temperature, that portion will be malformed or warped. On the other hand, increasing the processing temperature significantly above the melting temperature is self-defeating since nylon 66 is too fluid (lacks melt strength) at temperatures slightly above the melting temperature. The second factor is the temperature dependence of viscosity. This can be illustrated by an example.

If it is assumed that the surface cooling rate of a parison is about 2° F./sec (radiative loss only) and the temperature dependence of melt viscosity is 130 poise/°F., then the melt-viscosity change as the parison drops and just before blowing is at least 260 poise in the 2-sec time interval from the start of parison drop to the initiation of the blow cycle. This viscosity change is so significant that the object will be thin in some areas where the viscosity is low and thick in others where the viscosity is high. But viscosity alone does not tell the complete story. Part of the problem is caused by the high absolute melt temperature of nylon 66, since radiative heat losses are a function of temperature to the fourth power.

Also, in those areas where the part is thicker, greater shrinkage will occur, which aggravates the problem of malformed articles. Both of these considerations make it very difficult to blow mold an unmodified nylon 66 homopolymer.

It could be argued that increasing the processing temperature to a value considerably above the freezing point would allow sufficient time before freezing and that would afford more uniform objects. However, in general, high melt viscosities are preferred for blow molding. Raising the temperature defeats this, and furthermore only increases the rate of radiative heat loss.

The situation is somewhat better with nylon 6 because of the greater disparity between melting and freezing points (442° F. and 338° F.) and the lower absolute melting point and corresponding heat loss permit a longer time for parison drop. Additionally, the temperature dependence of the melt viscosity of nylon 6 is 40 poise/°F. about one-third the value of nylon 66. Not surprisingly, most commercial nylon blow molding applications are in nylon 6 or copolymers thereof, where the lower absolute melting and freezing points (and differences), lower freezing rates, and temperature-dependent viscosity coefficients are advantageous.

Additionally, a resin with lower crystallinity is preferred for blow molding because the freezing rate is retarded significantly. One way of doing this is through the use of copolymers. For example, a (50/50) 6/66 nylon copolymer with a corresponding crystallinity of 40%. Reducing the crystallinity even further requires higher orders of copolymers or modification by agents that retard crystallinity or crystallization rates.

Increasing the molecular weight of the nylon will obviously retard parison sag. However, this alone does not reduce the tendency of the parison to be malformed because it does not affect significantly the crystallinity and, hence, freezing and melting behavior.

U.S. Pat. No. 4,417,032 discloses a process for forming quasi-random copolymers from two or more homo polyamides. In this process, the homo polyamides are melt blended in the presence of a phosphite promoter.

U.S. Pat. No. 3,509,107 discloses a process for increasing the relative viscosity of polyamide fibers or copolyamides by incorporating a phosphorous or phosphite compound into the polyamide under an inert gas atmosphere. The primary object of U.S. Pat. No. 3,509,107 is to provide a process for increasing the viscosity of polyamide yarn and cord which requires a minimum amount of gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569,184 discloses a method for producing a random copolymer from nylon 6 and nylon 6,6. The invention described herein teaches that heating a mixture of nylon 6 and nylon (,6 results in interchange between various sections of the respective polymer molecules with the final product being a random copolymer of nylon 6 and nylon 6,6. In order to produce a random copolymer of nylon 6 and nylon 6,6, British Patent No. 569,184 teaches that it is necessary to heat the mixture of homopolymers for periods of time up to 8 hours at 285° C. without any catalyst.

U.S. Pat. No. 4,390,667 discloses a process for decreasing the melt index and increasing the viscosity of polyamide fibers via incorporating a phosphate compound into the polyamide and heating the polyamide until the desired changes in the melt index and viscosity occur. The phosphate utilized in U.S. Pat. No. 4,390,667 include substituted aryl phosphates which satisfy certain Hammett sigma values.

U.S. Pat. No. 4,417,031 discloses a process for preparing block and graft copolymers. The described process involves reacting two or more polyamides, polyesters, acid homopolymers of β-unsaturated carboxylic acids in order to form a graft and/or block copolymer. Included in the patent are copolymers formed from poly(caproamide) and poly(hexamethylene adipamide).

Diphenyl phosphoryl azide has been used as a convenient reagent for racemization-free peptide synthesis and for polymerization of peptides such as β-alamino and L-alanylglycine. See for example, Nishi, Noro et al. "Polymerization of Amino-acids or Peptides with Diphenyl Phosphoryl Azide (DPPA)", Int. J. Biol. Macromol., Vol. 2, p. 53 (1980) and Shiori, Takayuki, "Diphenylphosphoryl Azide. A New Convenient Reagent for a Modified Curtius Reaction and for the Peptide Synthesis", *J. of the American Chemical Society*, Vol. 94, p. 6203–6205 (1972).

BRIEF SUMMARY OF THE INVENTION

In accordance with this invention, there is provided an improved blow molding process for polyamides, said process of the type where a molten polyamide is placed into a mold, a gas is introduced into said mold to form a molten preform having the form of said mold and the molten polyamide preform is cooled to form said hollow article having the form of said mold, the improvement which comprises adding to said molten polyamide an effective amount of an aryl phosphoryl azide compound of the formula:

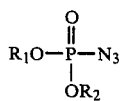

wherein:

$R_1$ is selected from the group consisting of phenyl and phenyl substituted with one or more substituents such as phenyl, phenoxy, phenylalkyl, alkylphenyl, alkoxyphenyl, alkyl, alkoxy, nitro, halo and the like, which are inert under the process conditions: and $R_2$ is selected from the group consisting of $R_1$, hydrogen, alkyl, haloalkyl and metal or non-metal cations.

By the addition of the aryl phosphoryl azide compounds, the polyamide can be blow molded without the need to use copolymers such as nylon 6/nylon 66 copolymers.

BRIEF DESCRIPTION OF THE DRAWINGS

FIG. 1 is a graph showing the melt viscosity and the melt elasticity of nylon 6 and of nylon 6 containing 1% diphenyl phosphoryl azide as a function of shear rate.

DETAILED DESCRIPTION OF THE INVENTION

The first step of the process consists of forming a molten mixture of an appropriate polyamide and one or more aryl phosphoryl azide compounds of the formula:

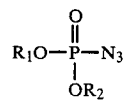

wherein $R_1$ and $R_2$ are as described above. As used herein, a "molten mixture" is a mixture which has been heated to a temperature which is equal to or greater than the melting point of the polyamide component of the mixture. The manner in which the molten mixture is formed is not critical and conventional methods can be employed. For example, the molten mixture can be prepared through use of conventional polyamide and additive blending means, in which the polyamide is heated to a temperature equal to or greater than its melting point. An effective amount of the aryl phosphoryl azide compound in a granulated, powdered or liquid form either neat or diluted with a diluent is then added to the melted polyamide while vigorously stirring the melt. Heating is continued until the required decrease in melt index and increase in viscosity has been obtained.

Alternatively, the components of the composition can be granulated and the granulated components mixed dry with a suitable aryl phosphoryl azide either in neat form or diluted with a diluent in a suitable mixer, as for example a Branbury Mixer, a tumbler or the like, as uniformly as possible and thereafter dried in a vacuum. Thereafter, the composition is heated in an extruder until the polyamide is melted. As described above, the mixture is heated until the desired increase in the melt index and viscosity has been obtained, and it is thereafter expressed with cooling.

The order of mixing of the various components is not critical. Accordingly, the order of addition of the polyamide and aryl phosphoryl azide components, or other optional components, to be described in more detail hereinbelow to form the mixture, can be varied as desired.

The process of this invention is preferably carried out in the absence of air, as for example in the presence of an inert gas, such as, argon, neon, nitrogen or the like. The process can be carried out in a batchwise or discontinued fashion, as for example, carrying out the process in a sealed container. Alternatively, the process can be carried out in a continuous fashion in a single processing zone, as for example by use of an extruder as described hereinabove, or in a plurality of such reaction zones in series or parallel.

Reaction temperatures are not critical and can be varied widely as desired. However, it should be appreciated that the process temperature should be at least as high as the melting point of the particular polyamide employed, and below the degradation temperature of the polyamide. In the preferred embodiments of this invention, the process temperature is such that the polymer will remain in the molten state during the conduct of the process. In the particularly preferred embodiments of this invention employing particularly preferred polyamide compositions, and in which the melt index and viscosity of the polymer is increased the particularly preferred amount, the process temperature is at least about 260° C. Amongst these particularly preferred embodiments, most preferred process temperatures are in the range of from about 260° C. to about 295° C., with the melting temperature of the polyamide being the process temperature of choice.

Similarly, process pressures are not critical and can be varied widely without adversely affecting the process. Consequently, the process can be conducted at sub-atmospheric, atmospheric or super-atmospheric pressures.

Best results are obtained when the process of this invention is carried out in the presence of as little water as possible. Ideally, the conditions will be anhydrous, and this represents the most preferred embodiments of the invention. However, good results can be obtained when as much as 0.165 weight percent water based on the total weight of the mixture is present therein. In the preferred embodiments, the weight percent of water is less than about 0.1 weight percent based on the total weight of the mixture, and in the particularly preferred embodiments, the weight percent of water is less than about 0.05 weight percent on the same basis.

Aryl phosphoryl azide compounds useful in the practice of this invention are those of the formula:

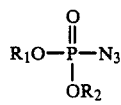

wherein $R_1$ and $R_2$ are as described above. Illustrative of useful compounds are those in which $R_1$ is an aryl substituent such as phenyl or substituted phenyl as for example 2-aminophenyl, 3-aminophenyl, 2-benzyloxyphenyl, 3-benzyloxyphenyl, 4-benzyloxyphenyl, 2-bromophenyl, 3-bromo-5-chlorophenyl, 3-bromo-2,4-dimetrophenyl, 5-bromo-2-nitrophenyl, 2-butoxyphenyl, 3-chlorophenyl, 4-chloro-2,3-di-nitrophenyl, 2,4-dibromophenyl, 2,6-dichlorophenyl, 2,4-diiodophenyl, 3,5-dimethoxyphenyl, 2-ethoxyphenyl, 4-ethoxyphenyl, 2,5-dinitrophenyl, 4-heptyloxyphenyl, 4-hexyloxyphenyl, 4-methyoxyphenyl, 4-methoxy-2-nitrophenyl, 4-octyloxy phenyl, 4-propoxyphenyl, 2,3,5-trichlorophenyl, 2,3,5-triiodophenyl, 4-isobutylphenyl, 4-isopropyl-1-ethylphenyl, 2-methoxy-4-propenylphenyl, 4-methyl-1,3,5-chlorophenyl, 4-pentylphenyl, 2-propylphenyl, 2,3,5,6-tetramethylphenyl, 3,5-di-tert-butylphenyl, 4-tert-butylphenyl, 3-isopropylphenyl, 2,4-dimethylphenyl, 2-methylcarbonyl phenyl and the like. The $R_2$ substituents can vary widely and include alkyl and substituted alkyl groups such as tert-butyl, n-butyl, isopropyl, hexyl, 2-nitropropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanium and other metal salts and/or ammonium phosphoryl azide compounds in which $R_2$ is a cation are also illustrative of useful compounds.

Preferred for use in the practice of this invention are phosphoryl azide compounds in which $R_1$ and $R_2$ are the same or different and are phenyl or substituted phenyl. In the particularly preferred embodiments of the invention, $R_1$ and $R_2$ are the same or different and are phenyl or phenyl substituted with one or more nitro, phenoxy, halo, phenyl, alkylphenyl, phenylalkyl, alkyl, alkoxy, phenyl or alkoxy groups. Amongst these particularly preferred embodiments, most preferred are those embodiments in which $R_1$ and $R_2$ are the same and are phenyl, phenyl substituted with one or more alkyl, phenyl, phenylalkyl or alkoxy groups, with diphenyl phosphoryl azide being the phosphoryl azide compound of choice.

While we do not wish to be bound by any theory, it is believed that addition of the aryl phosphoryl azide compounds increases the melt viscosity and the melt elasticity of the polyamide to allow it to be blow molded. An effective amount of the substituted aryl phosphoryl azide compound is employed in forming the molten mixture. As used herein "an effective amount" is an amount of the aryl phosphate compound which when added to a polyamide in accordance with the invention forms a mixture having a viscosity which is greater than that and a melt elasticity which is greater than of the polyamide as measured prior to such addition. Normally, the greater the amount of aryl phosphoryl azide compound employed, the greater the increase in melt viscosity melt elasticity attained: and conversely, the less the amount of aryl phosphoryl azide compound employed, the less the increase in melt elasticity and melt viscosity attained. Usually, the amount of aryl phosphoryl azide compound used is at least about 0.05 weight percent based on the total weight of the mixture. In the preferred embodiments of this invention, the quantity of aryl compound employed is from about 0.05 to about 10 weight percent based on the total weight of the mixture. In the particularly preferred embodiments of this invention, the weight percent of aryl phosphoryl azide compound is in the range of from about 0.2 to about 5 weight percent, and amongst these particularly preferred embodiments, those in which the quantity of phosphoryl azide compound employed is from about 0.2 to about 2 weight percent based on the total weight of the mixture are most preferred, with from about 0.5 to about 1.5 weight percent being the quantity of choice.

Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

in which R is an alkylene group of at least 2 carbon atoms, preferably from about 2 to about 10 or arylene having at least about 6 carbon atoms preferably about 6 to about 16 carbon atoms; and $R_1$ is selected from R and phenyl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly (decamethylene azelamide) (nylon 10,9), poly(decamethylene sebacamide) (nylon 10,10), poly[bis(4-amino cyclohexyl)methane-1,10-decanecarboxamide)] (Quiana), poly(m-xylene adipamide), poly(p-xylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide).

Various other optional ingredients, which are normally included in polyamide compositions, may be added to the mixture at an appropriate time during the conduct of the process. These optional ingredients can be added either prior to or after melting of the polyamide in the first step of the process of this invention; or after the conduct of the second step in which the melt index and viscosity changed the desired amount. Such optional components include fillers, plasticizers, impact modifiers, colorants, mold release agents, antioxidants, ultraviolet light stabilizers, lubricants, antistatic agents, fire retardants, and the like. These optional components are well known to those of skill in the art, accordingly, only the preferred optional components will be described herein in detail.

The composition for use in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, etc, such fillers are well known materials and are readily available. The foregoing recited fillers are illustrative only and are not meant to limit the scope of the fillers that can be employed in this invention. In the preferred embodiments of this invention, fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polyamide component, and in the particularly preferred embodiment is in the range of from about 30 to about 90 weight percent on the same basis.

It is also very desirable to include a plasticizer of the type known in the art for use with polyamide composition. Useful plasticizers include caprolactam, mixtures of ortho and para toluene ethyl sulfonamides, and the like.

In the second step of the process, the molten mixture of the polyamide and aryl phosphoryl mixture is blow molded using conventional techniques. Any conventional blow molding procedures such as extrusion blow molding, injection blow molding, stretch blow molding, multilayer blow molding and the like can be used. For example, a simple extrusion blow molding procedure can be used in which a parison (a round hollow tube is extruded from the molten polyamide mixture) which is entrapped between the two halves of a mold. The parison is expanded with air pressure (usually 100 psi) or steam against the cavity of the mold to form the parts having the configuration of the mold. The blown part is then cooled, removed from the mold and excess flesh is trimmed from the part and reclaimed for further use.

The process of this invention provides polyamide compositions having increased melt viscosity and increased melt elasticity as compared to polyamide compositions which do not include aryl phosphoryl azide compounds. Because f the additional and unexpectedly large increases in melt viscosity and melt elasticity, the polyamides are especially useful in blow molding of molded parts such as bottled and similar articles.

The following examples are presented to more particularly illustrate the invention, and should not be construed as being limitations on the scope and spirit of the invention.

EXAMPLE I (A) Composition Preparation

Commercial grade nylon 6 of molecular weight of 35–40,000 from Allied-Signal Inc. was freeze ground to an average particle size less than 2 mm in a conventional grinding mill and subsequently vacuum dried at 95° C. The polymer was then coated with 1% diphenylphosphorylazide (DPPA) by weight based on the weight of the polymer. A solution coating process was chosen to ensure uniformity in the dispersion of the DPPA. The coated granular resin was then dried, extruded and pelletized. The extrusion was carried out on a one inch single screw extruder, with fluted mixing sections and a die zone temperature of 280° C. The extruded strand was quenched in a water bath containing water/ice mixture and subsequently pelletized. The pellets obtained is the modified nylon resin used for the extrusion blow molding operation.

(B) Blow Molding Procedure

The extrusion blow molding process line used contained a plasticating extruder to melt and pump the resin, an annular exit die fitted to the extruder to form the parison, auxillary equipment to cut and position the parison in the mold and the mold itself whose inner wall forms the shape of the desired object. The screw used for the extruder was a single flighted 80 mm diameter and equipped with mixing pins. The modified nylon was extruded through the annular die with the exit melt temperature at 272° C. The parison formed was then cut and enclosed in the mold whose walls were maintained at 7° C. by a circulating coolant. Final shaping of the parison in the mold is achieved by pinching the bottom of the parison and blowing air into the mold until the parison takes the shape of the inner wall. The mold is then opened and the bottle ejected. Processing of nylon 6 control resin which does not contain DPPA under similar conditions, however, does not yield the bottle.

EXAMPLE II

A series of experiments were carried out to show the effect of aryl phosphoryl azide compounds on the melt viscosity and melt elasticity of polyamides. The procedures employed are as follows:

A. Composition Preparation

Commercial grade nylon 6 of molecular weight of 35-40,000 from Allied-Signal Inc. was freeze ground to an average particle size less than 2 mm in a conventional grinding mill and subsequently vacuum dried at 95° C. The polymer was then coated with 1% and 2% diphenylphosphorylazide (DPPA) by weight based on the weight of the polymer. A solution coating process was chosen to ensure uniformity in the dispersion of the DPPA. The coated granular resin was then dried, extruded and pelletized. The extrusion was carried out on a one inch single screw extruder, with fluted mixing sections and a die zone temperature of 280° C. The extruded strand was quenched in a water bath containing water/ice mixture and subsequently pelletized.

(B) Rheological Properties

The melting temperature, melt elasticity and melt viscosity of the various samples were determined. The melting temperature of the various samples were determined by differential scanning calorimetry (DSC). In these experiments, a Dupont 9900 Thermal Analyzer with a DSC cell in argon atmosphere was used. A sample was crimped in an aluminum pan and heated at 10° C. min. After initial heat-up, the sample was held at 250° C. for 5 min. prior to either programmed cooling (10° C./min.) or quenching in liquid nitrogen. A subsequent reheat was carried out under the same conditions as the initial heat-up.

The melt viscosity and melt elasticity measurements were made using a Rheometric Dynamic Spectrometer. In these experiments, samples for rheological measurements were dried under vacuum generally pressure lower than 0.05 mm:Hg at 95° C. for a period of 15 hr. and stored in a dry atmosphere. A Rheometric Dynamic Spectrometer was used to measure properties of the nylon melt at 260° C., namely the storage modulus (G') and the complex viscosity ($\eta^*$). Measurements were made in a parallel plate geometry using the 25 mm diameter plates over a frequency (i.e. deformation rate, analogous to shear rate) range of 1-500 radians/second.

The results of these experiments are set forth in the following Table I and in FIG. 1. In Table I, Sample A is nylon 6 pellets obtained from Allied-Signal Inc. under the trade designation 8207F: Sample B is freeze ground 8207F nylon 6: Sample C is re-extruded freeze ground 8207F nylon 6; Sample D is re-extruded freeze ground 8207F nylon 6 containing 1% by weight of DDPA: and Sample E is re-extruded freeze ground 8207F nylon 6 containing 2% by weight of DPPA.

TABLE I

| Sample | Initial Heat-Up (Tm) °C. | Cooling Tcc (°C.) | Reheat Tm (°C.) | Melt Viscosity (Pa.S) | Melt Elasticity (Pa) |
|---|---|---|---|---|---|
| A | 225.3 | 166.5 | 223 | — | — |
| B | 224.1 | 172.7 + 183 | 222.6 | — | — |
| C | 223.6 | 186.5 | 221.5 | 585 | 130 |
| D | 222.7 | 179.1 | 217 | 5290 | 49,000 |
| E | 222.4 | 177.5 | 216 | — | — |

What is claimed is:

1. A process for blow molding polyamides which comprises the steps of:
   (a) forming a molten mixture of one or more polyamides and an effective amount of one or more aryl phosphoryl azide compunds of the formula:

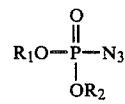

wherein:
   $R_1$ is selected from the group consisting of phenyl or phenyl substituted with one or more substituents which are inert under process conditions: and
   $R_2$ is selected from the group consisting of alkyl, haloalkyl, nitroalkyl, hydrogen, a metal or nonmetal cation or $R_1$ substituents:
   (b) placing said molten mixture into a mold having a predetermined configuration:
   (c) introducing gas into said mold to form a hollow molten mixture preform having the configuration of said mold: and
   (d) cooling said molten preform to form a hollow article having the configuration of said mold.

2. A process according to claim 1 wherein at least one of said polyamides is polycaprolactam or poly hexamethylene adipamide.

3. A process according to claim 3 wherein said mixture comprises two polyamides, one of said polyamides being polycaprolactam and polyhexamethylene adipamide.

4. A process according to claim 4 wherein said mixture is heated at a temperature of from 245° C. to about 315° C.

5. A process according to claim 5 wherein said heating step is conducted in two stages, the first of which is at a temperature from about 245° C. to about 315° C., and the second of which is at a temperature of from abut 240° C. and about 315° C.

6. A process according to claim 5 wherein said first and second stages are conducted at temperatures from about 265° C. to about 305° C.

7. A process according to claim 1 wherein said polymer is heated for a period of time of from about 2 to about 20 minutes.

8. A process according to claim 7 wherein said period of time is from about 2 to about 10 minutes.

9. A process according to claim 1 wherein $R_1$ and $R_2$ are the same or different and are phenyl or substituted phenyl.

10. A process according to claim 9 wherein $R_1$ and $R_2$ are the same or different and are phenyl or phenyl substituted with one or more alkyl, halo, nitro, phenyl, phenoxy, alkylphenyl, alkoxyphenyl, phenylalkyl or alkoxy groups.

11. A process according to claim 10 wherein $R_1$ and $R_2$ are the same or different and are phenyl or phenyl substituted with one or more phenyl, alkyl, alkoxy or phenylalkyl groups.

12. A process according to claim 11 wherein $R_1$ and $R_2$ are the same or different and are phenyl or phenyl substituted with one or more alkyl or alkoxy groups.

13. A process according to claim 1 wherein said aryl phosphoryl azide compound is diphenyl phosphoryl azide.

14. A process according to claim 1 wherein said mixture is heated in the absence or substantial absence of water.

15. A process according to claim 14 wherein the amount of water in said mixture is less than about 0.1 weight percent based on the total weight of the mixture.

16. A process according to claim 1 wherein the amount of aryl phosphoryl azide compound is at least about 0.1 percent by weight of the mixture.

17. A process according to claim 16 wherein said amount is from about 0.1 to about 10 weight percent by 18. A process according to claim 16 wherein said amount is from about 0.2 to about 5 percent by weight.

19. A process according to claim 18 wherein said amount is from about 0.2 to about 2 percent by weight.

20. An article formed by the process of claim 1.

* * * * *